Feb. 8, 1927.

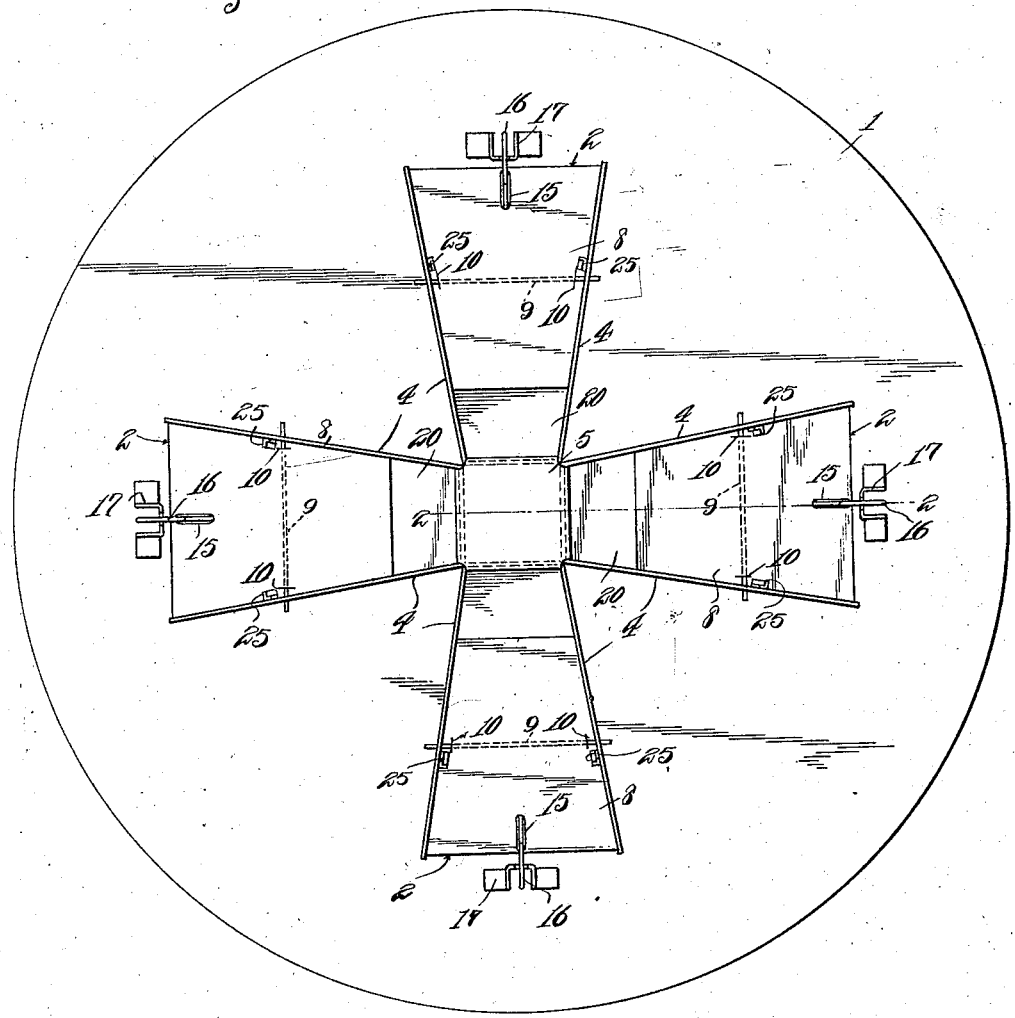

G. A. ABRAMSON

TRAP

Filed Oct. 7, 1926   2 Sheets-Sheet 2

Inventor
G. A. Abramson

Patented Feb. 8, 1927.

1,616,882

UNITED STATES PATENT OFFICE.

GEORGE A. ABRAMSON, OF SHERWOOD, MINNESOTA.

TRAP.

Application filed October 7, 1926. Serial No. 140,150.

This invention relates to fishing and trapping and more particularly to a trap for catching rats, mice, and other small animals. The trap is specifically of the type including a body adapted to be supported upon a water receptacle in covering relation to the upper end thereof and a tilting platform pivotally mounted in an opening formed in the body and leading to a bait holder or receptacle so that when the rat or other animal approaches the bait holder across the platform, its weight will tip the platform and cause the animal to be dropped into the water receptacle and drowned therein.

Traps of this general type have been previously used but it has been found that when a rat steps upon the platform and it starts to tilt, the animal will very often jump off of the platform before it has tilted a sufficient distance to drop the animal into the water receptacle. Therefore, one object of the invention is to provide the trap with a tilting platform which will be securely held in a horizontal position until the animal has moved along it toward the bait holder to such a position that it cannot successfully retrace its steps or leap to safety when the platform tilts.

Another object of the invention is to provide an improved type of latch carried by the main platform and adapted to securely retain the same in a horizontal position until released by the animal stepping onto an auxiliary platform carried by the main platform and projecting from its inner end toward the bait holder.

Another object of the invention is to provide the body of the trap with an improved arrangement of tilting platforms and guard walls therefor, the guard walls being disposed along the sides and inner ends of the openings in which the platforms are mounted and having their inner end portions cooperating to form a bait house toward which all of the platforms lead.

The invention is illustrated in the accompanying drawings, wherein:

Figure 1 is a top plan view of the improved trap.

Figure 2 is an enlarged vertical sectional view taken on the line 2—2 of Figure 1.

Figure 3 is a fragmentary bottom plan view of the trap.

The trap constituting the subject matter of this invention includes a body portion 1 which is preferably formed of sheet metal and circular in shape, as shown in Figure 1. A suitable number of openings 2 are cut in the body and are preferably arranged in radiating relation to its center. In the present illustration, four openings have been formed in the body, but it will be obvious that the number may be increased or reduced if so desired. A guard is provided for each opening and includes an inner wall 3 projecting upwardly from the inner end of the respective opening 2 and side walls 4 extending from the inner wall 3 along opposite sides of the openings. By referring to Figure 2, it will be seen that the inner walls of the guards cooperate to provide side walls of a bait chamber, the upper end of which is open so that the bait may be placed in the bait chamber. A cover 5 is provided for the upper end of the bait chamber and is formed with depending side flanges which serve to engage the walls 3 and securely but releasably hold the cover in place. Openings 6 are formed in the walls 3 so that the animals to be entrapped may smell the bait and thereby be attracted toward the bait chamber. The bottom 7 of the bait chamber is formed by a portion of the body 1 and may be secured to the walls 3 by solder or in any other desired manner. When the guards are put in place, the lower portions of their walls project below the body and, if desired, the projected lower portions of the walls 3 may be severed from the walls 4 and form depending tongues adapted to be bent upwardly and soldered or otherwise firmly secured against the under face of the body to securely hold the guard in place and provide a good support for the bottom 7.

In each of the openings 2 is disposed a main platform 8 which extends longitudinally therein from its outer end and terminates in spaced relation to the bait chamber. A pivot pin or axle 9 extends transversely across the platform 8 with its end portions passed through slots 10 and rotatably mounted in openings formed in the side walls 4 of the guards. The platform will, therefore, be pivotally mounted so that its inner end portion may swing downwardly, as indicated by dotted lines in Figure 2, in order to allow an animal to drop into the water receptacle R upon which the body rests. As previously stated, it is desired to securely but releasably lock the platform 8 in a horizontal position and in order to do so there has been provided a latch. The latch consists of a strand of stiff wire bent to form a rod 12 which extends longitudinally of the platform and is slidably mounted in bearing brackets 13 which depend from the platform intermediate the pivot pin 9 and inner and outer ends of the platform. The wire strand is bent adjacent the outer end of the platform to form a shank or arm 14 which projects upwardly through a slot or opening 15 in the platform and is then bent to form a bill 16 which projects in overhanging relation to a keeper 17 mounted upon the body 1 and projecting upwardly therefrom in front of the opening 2. By an inspection of Figure 2, it will be seen that the sheet metal from which the keeper is formed is cut to provide a lip 18 projected from the body of the keeper and beneath which the bill of the latch is intended to engage in order to secure the platform in horizontal position. A spring 19, which extends diagonally between the platform and the rod 12 of the latch, has one end anchored to the pivot pin 9 and its other end secured to the latch rod. This spring yieldably retains the latch in an operative position and permits it to have movement into and out of engagement with the lip 18.

The auxiliary platform 20 which projects from the inner end of the main platform toward the bait holder or receptacle, extends in underlying relation to the inner end of the main platform and is cut to provide ears 21 and an abutment tongue 22. The hinge ears 21 are engaged about a pivot pin 23, the ends of which are mounted in bearings 24 secured against the under face of the main platform and the abutment tongue 22 is so disposed that it may engage the free inner end of the latch rod. By referring to Figures 2 and 3, it will be seen that when the animal reaches the end of the main platform, while approaching the bait holder, and steps upon the auxiliary platform, which may be referred to as a trigger, this platform will be swung downwardly and the abutment tongue engages the end of the latch rod 12 and imparts longitudinal movement thereto against the action of the spring 19. When this occurs, the bill 16 will be moved out of engagement with the tongue 18, thereby releasing the main platform so that the weight of the animal may swing the inner end portion of the main platform downwardly and the animal caused to drop into the water which partially fills the receptacle R. Upward movement of the outer end portion of the platform is limited by contact with bumpers 25 secured to the side walls 4. As soon as the animal leaves the platform, the weights 26 will return it to the horizontal position and the latch will again engage the tongue or lip 18 of the keeper. Since the free end of the latch rod is at all times in engagement with the abutment 22, it will be seen that the latch rod will constitute means to return the auxiliary platform to the horizontal position. I have, therefore, provided a trap which is self-setting and so constructed that an animal may approach the bait holder to the inner end of the main platform before the latch is released. Therefore, there will be no danger of the animal becoming frightened by the main platform tilting as soon as it moves a short distance past the pivot pin 9. Even if the animal attempts to jump back when the latch is released, this will be prevented by the guard walls.

Having thus described the invention, what I claim is:

1. In a trap, a body formed with an opening, a main platform pivotally mounted for vertical tilting in the opening, an auxiliary platform pivoted to the main platform, a keeper carried by said body adjacent the opposite end of the opening from said auxiliary platform, guides carried by said main platform, a latch rod slidably carried by said guides and having one end bent to form a bill, a spring engaged with said latch rod and yieldably retaining the latch rod in a normal position with its bill engaged with said keeper to lock the main platform in a horizontal position, and an abutment carried by the auxiliary platform to engage the latch rod and move the latch to a releasing position when the auxiliary platform is depressed.

2. In a trap, a body formed with an opening, a bait holder at one end of the opening, walls extending from the bait holder at opposite sides of the opening, a main platform pivotally mounted in said opening, said platform being normally horizontal and terminating in spaced relation to said bait holder, an auxiliary platform pivoted to said main platform and extending therefrom towards the bait holder, a keeper carried by said body adjacent the opposite end of the opening from the bait holder, a latch for engaging said keeper including a rod extending longitudinally beneath the main platform and slidably connected therewith and at one end formed with a bill to engage said keeper, and an abutment carried by and extending downwardly from said auxiliary platform and adapted to engage said latch rod and move the bill thereof out of engagement with the keeper to release the main platform when the auxiliary platform is swung downwardly.

3. In a trap, a body formed with an opening, a bait holder at one end of the opening, walls extending from the bait holder at opposite sides of the opening, a main platform pivotally mounted in said opening, said platform being normally horizontal and terminating in spaced relation to said bait holder, an auxiliary platform pivoted to said main platform and extending therefrom towards the bait holder, a keeper extending upwardly from the body adjacent the opposite end of the opening from the bait holder, guides depending from the main platform, a latch consisting of a rod slidably supported by said guides and having one end portion projected upwardly and bent to form a bill overhanging the keeper, means yieldably retaining the latch in a normal position with its bill engaged with said keeper, and an abutment depending from said auxiliary platform and adapted to engage said rod and move the latch out of engagement with the keeper to release the main platform when the auxiliary platform is swung downwardly.

In testimony whereof I affix my signature.

GEORGE A. ABRAMSON. [L. S.]